Sept. 10, 1929.  W. E. JOHNSON  1,727,603
AUTOMATIC TRANSMISSION
Original Filed April 18, 1923    4 Sheets-Sheet 2
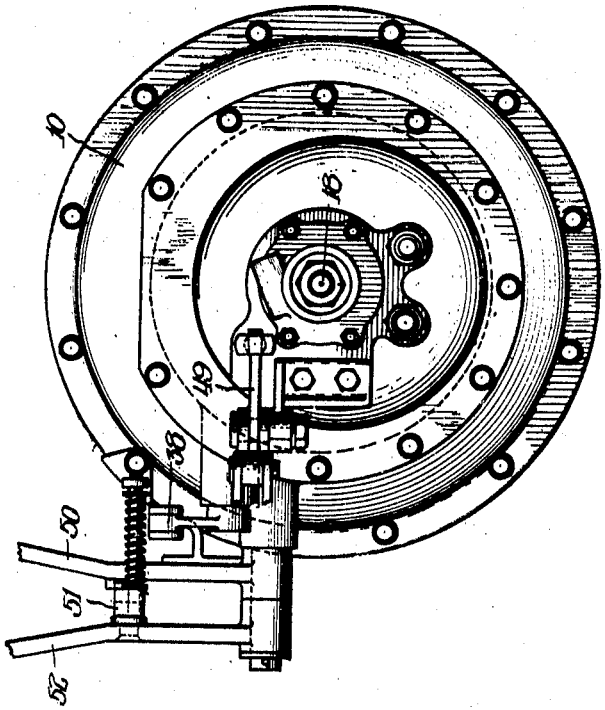
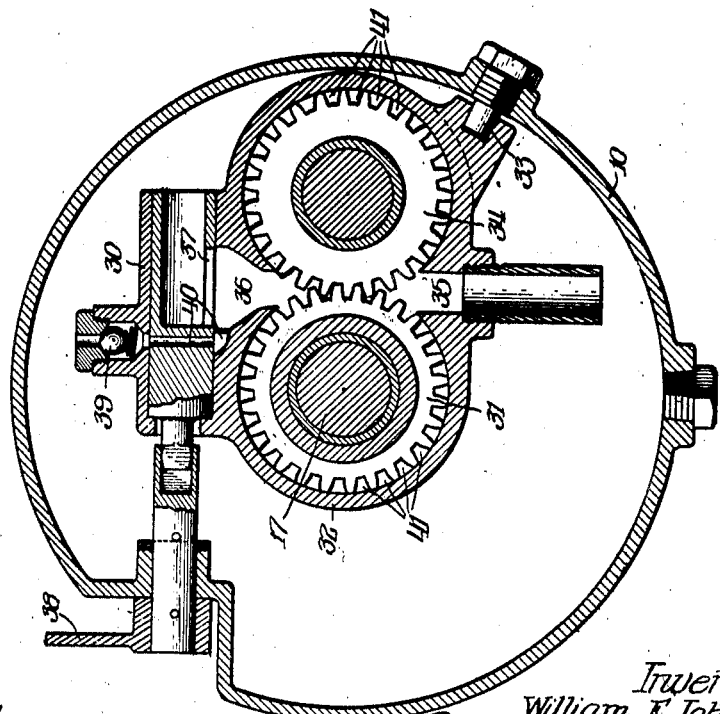

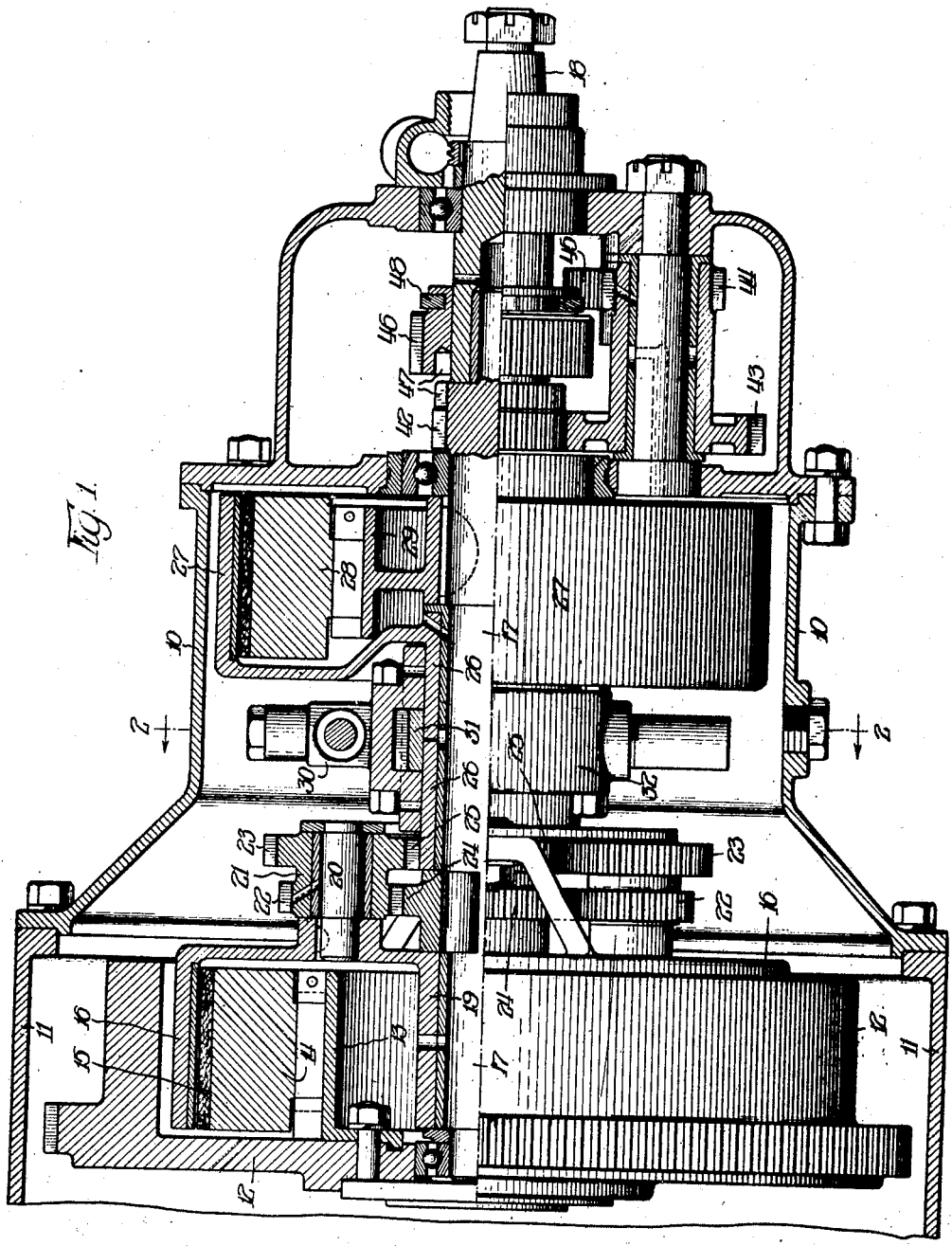

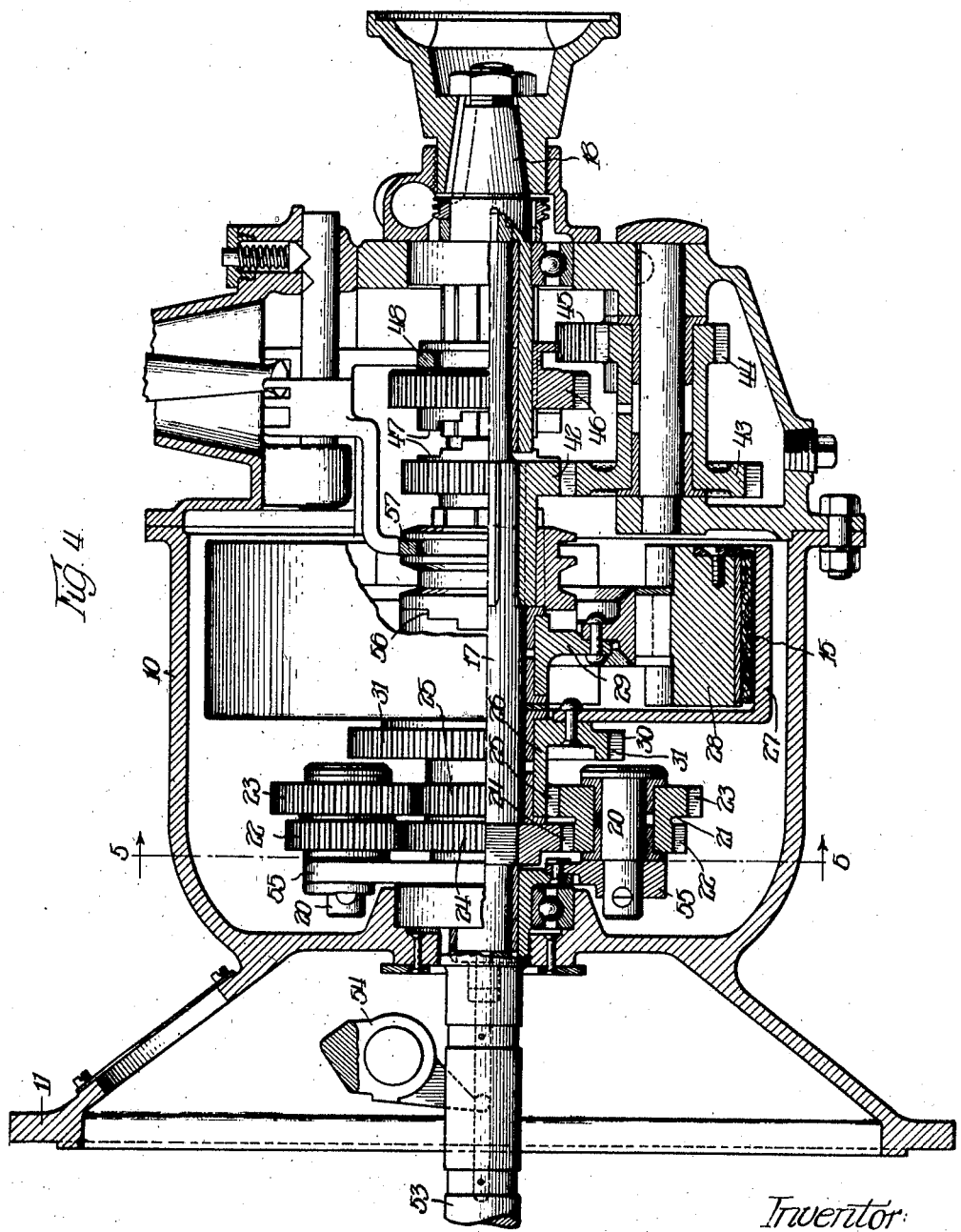

Sept. 10, 1929.  W. E. JOHNSON  1,727,603
AUTOMATIC TRANSMISSION
Original Filed April 18, 1923   4 Sheets-Sheet 4
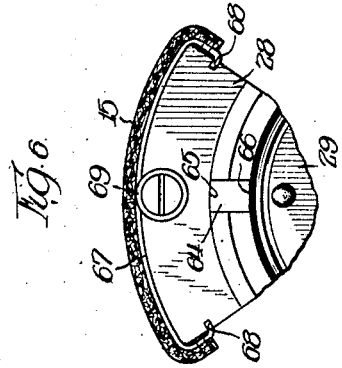
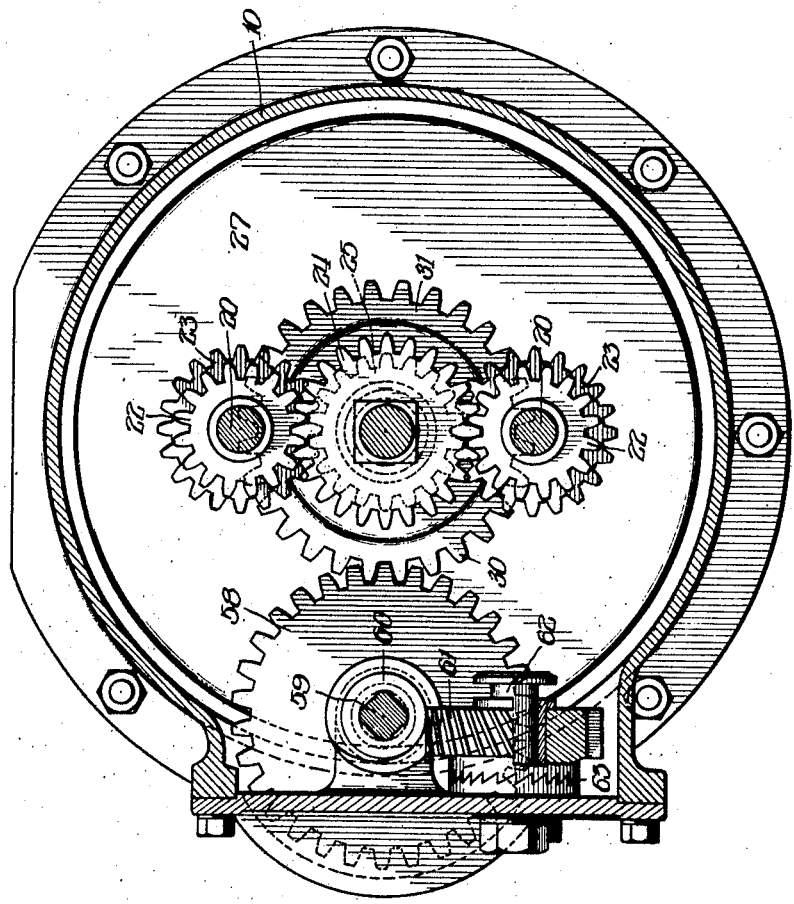
Witness:
G. Burkhardt.
Inventor:
William E. Johnson
By Cromwell, Greist & Warden
attys.

Patented Sept. 10, 1929.

1,727,603

UNITED STATES PATENT OFFICE.

WILLIAM E. JOHNSON, OF CHICAGO, ILLINOIS, ASSIGNOR TO FLEXO-DRIVE CORPORATION, OF CHICAGO, ILLINOIS, A CORPORATION OF ILLINOIS.

AUTOMATIC TRANSMISSION.

Application filed April 18, 1923, Serial No. 633,034. Renewed July 8, 1929.

The present invention relates to power transmitting mechanisms, and more particularly has to do with an improved flexible transmission adaptable for use with motor driven vehicles and capable of a gradual speed ratio variation from zero to maximum controlled automatically by the resistance torque of the load.

The principal object of the invention resides in the provision of a novel transmission of the character described which operates in its speed ratio variation under a multiplication of torque.

Another object of the invention resides in the provision of a novel construction and arrangement of transmission parts wherein certain of the parts are adapted to co-operate with a skeleton fly wheel of the vehicle motor with which associated in such a way as to provide suitable mass and balance for the wheel—an arrangement serving to lighten and condense, in a most advantageous manner, the aggregate weight and size of the coupled motor and transmission.

Still another object of the invention resides in the provision of a novel device which is operable at will to prevent retrograde movement of a rotatable part of the transmission.

While the foregoing statements are indicative of the nature of the invention, other objects and advantages not herein specifically referred to will be appreciated upon a full comprehension of the novel features presented in the construction, arrangement and manner of operation of the present transmission.

In order that the invention may be readily understood, two exemplifying embodiments of the same are set forth in the accompanying drawings and in the following detailed description based thereon. Obviously, the invention is susceptible of embodiment in other and varied constructional forms without departure from the essence of the invention or the sacrifice of its material advantages; wherefore it is to be understood that the drawings and description are to be considered in an illustrative and not in any unnecessarily limiting sense.

In the drawings,

Figs. 1, 2 and 3 are various views of one embodiment of the present transmission—Fig. 1 being a view of the transmission showing the outer casing in vertical diametric section, the interior mechanism above the transmission axis in vertical diametric section, and the interior mechanism below the axis in side elevation; Fig. 2 being a vertical transverse section on the line 2—2 of Fig. 1; and Fig. 3 being a rear end elevation of the transmission casing;

Figs. 4, 5 and 6 are various views of another embodiment of the invention—Fig. 4 being a view of the transmission showing the casing in vertical diametric section, the interior mechanism above the axis of the transmission in side elevation, and the interior mechanism below the axis in vertical diametric section; Fig. 5 being a vertical transverse section on the line 5—5 of Fig. 4; and Fig. 6 being a fragmentary detail showing one of the weights employed in both embodiments of the invention.

The transmission comprises generally a prime mover or driving element, a load-carrying driven element, and flexible connecting means therebetween which may be rendered operative at will to permit of a gradual speed ratio variation between the prime mover and the driven element under a multiplication of torque. The connecting means referred to is saliently characterized by the inclusion of a flexible coupling means and by the inclusion of a gear train which is operatively associated with the prime mover, the driven element and an intermediary member, the member being rotatable about the axis of the driven element and being adapted, when held against retrograde movement, to effect a reduced driving connection between the prime mover and the driven element; and the flexible coupling means being adapted to bring the intermediary member gradually from a stationary position to synchronous rotation with the driven element when the latter is rotated at sufficient speed. It is in the construction, arrangement and operation of this connecting means that the present invention resides.

The embodiment of the invention which will first receive detailed consideration is that illustrated in Figs. 1, 2 and 3 of the drawings. It will be observed, upon a careful inspection of these views, that the transmission is housed within an oil-tight casing 10 which extends rearwardly from the crank casing 11 of the motor with which the transmission is operatively associated.

The prime mover, which is represented in this embodiment as the fly wheel 12 of the associated motor, has rigidly mounted on the rear face thereof an annular weight spider 13 which is provided with suitable means for positioning a plurality of radially movable weight members 14 at regular intervals about its periphery. The outer faces of the weight members are arcuately shaped and are provided with fabric friction coverings 15. Upon rotation of the prime mover, the weight members are shifted radially under centrifugal force and bear frictionally against an encompassing drum 16.

The driven element, which is for convenience in consideration represented as a shaft 17 although embodied also in a rearwardly disposed shaft 18 when the reversing mechanism to be hereinafter described is brought into use, is located in axial alignment with the prime mover and provides on its forward end a suitable journal for the hub portion 19 of the drum 16.

The gear train, which was, at the commencement of this description, referred to as forming a portion of the connecting means between the prime mover and the driven element, comprises one or more pairs of diametrically opposed stub shafts 20 which are rigidly carried by the intermediate web portion of the drum 16, double pinions 21 which are journalled on the stub shafts and are characterized by small pinions 22 and large pinions 23, a pinion 24 which is in mesh with the small pinions 22 and is rigidly mounted on the shaft 17, and a pinion 25 which is in mesh with the large pinions 23 and is rigidly mounted on the front end of a rearwardly extending sleeve 26 journalled on the shaft 17.

The flexible coupling means, which was also referred to as forming a portion of the connecting means between the prime mover and the driven element, comprises a drum 27 and coacting radially movable weight members 28. The drum 27 and weight members 28 are in a general way similar to the previously described drum 16 and weight members 14; and the drum 27 is rigidly mounted on the rear end of the sleeve 26, and the weight members 28 are positioned at regular intervals about the periphery of an annular weight spider 29 which is rigidly mounted on the shaft 17.

A device 30, which is operable at will to hold the sleeve 26 with its associated pinion 25 and drum 27 against retrograde or reverse movement, is eccentrically positioned about the sleeve 26 between the gear train and the flexible coupling means, and engages with a pinion 31 which is rigidly mounted on the sleeve. The device, as shown in Fig. 2, is housed within an oil-tight casing 32 which encompasses the pinion 31 and is held against rotation therewith by a removable anchoring stud 33 carried by the transmission casing. The device includes a freely rotatable pinion 34 which closely meshes with the pinion 31, an oil inlet port 35 leading from the bottom of the casing to the point of meshing of the pinions, an oil outlet port 36 leading from the point of meshing to the top of the casing, a valve 37 which is manually operable exteriorly of the transmission casing by a control lever 38 for closing the outlet port, and a vacuum operated valve 39 associated with the outlet port for feeding air thereto through two permanently communicating ducts 40 when the valve 37 is closed.

It will be understood from this construction that, when the pinion 31 is rotating in a clockwise direction as viewed in Fig. 2, oil is drawn from the oil reservoir in the bottom of the transmisison casing through the inlet port 35 which is submerged in the oil, and is carried from the inlet port 35 to the outlet port 36 in the substantially oil-tight moving pockets 41 formed between the adjoining teeth of each pinion and the casing. When the valve 37 is operated to close the outlet port 36, the pressure of the oil trapped above the pinions prevents further rotation of the pinion 31 in that direction, since the oil cannot pass downwardly between the pinions because of their substantially oil-tight meshed relation. The pinion 31 can rotate in the other direction, however, with the valve 37 still closed, because, after the oil trapped in the outlet port 36 is carried back to the port 35 in the pockets 41, the valve 39 is automatically opened by the vacuum forming in the now emptied outlet port 36 and prevents the formation of such a vacuum as would tend to hold the pinion 31 against rotation. This device, when operated to hold the pinion 31 against retrograde movement, does so with a gradual cushioned effect which eliminates any abrupt halting of the pinion such as would tend to start with a jerk the transmisison of power at a reduction. With the employment of this device, the front flexible coupling means can be dispensed with for a rigid connection at that point, if desired, although the coupling means of course serves to increase the degree of flexibility of the transmisison.

The reverse mechanism for the transmission is located in the rear portion of the casing 10 and comprises means for connecting the shaft 18 with the shaft 17 whereby to obtain either a synchronous or a reverse rotation of the former with relation to the latter.

The mechanism may be of any approved type, and is exemplified in the drawings as a pinion 42 which is rigidly mounted on the rear end of the shaft 17, a pinion 43 which meshes with the pinion 42 and is journalled on a countershaft mounted in the casing 10, a pinion 44 which is axially spaced from the pinion 43 and rigidly secured thereto through an intervening sleeve portion, a pinion 45 which meshes with the pinion 44 and is journalled on another countershaft mounted in the casing, and a pinion 46 which is splined on the shaft 18 and is adapted to be shifted axially thereof either forwardly into clutched engagement with the pinion 42 through the interlocking of clutch elements 47 carried on the opposed faces of the pinions, or rearwardly into mesh with the pinion 45, whereby either a direct or reverse drive between the shafts 17 and 18 is obtained. The means for shifting the pinion 46 comprises a fork arrangement 48 which engages in a groove of the pinion and is operated exteriorly of the casing 10 by a lever 49. It will of course be understood that the pinion 46 is shown in Fig. 1 in its neutral position.

The operation of that form of the invention illustrated in Figs. 1, 2 and 3 will now be described. It will first be assumed that the prime mover is rotating slowly at what is usually termed an idling speed, that the load-carrying driven element is at rest, and that the reversing pinion 46 has been shifted forwardly to effect a direct connection between the two shaft portions of the driven element. Owing to the negligible centrifugal force set up in the weight members 14 by the rotation of the prime mover at an idling speed, the weight members will slide around the inner periphery of the drum 16 without frictionally engaging with the same.

If the speed of rotation of the prime mover is increased, however, the weight members 14 will frictionally engage with the drum 16 and will gradually bring the speed of rotation of the same up to that of the prime mover. Inasmuch as the driven element is at rest, the small pinions 22 will travel around the stationary pinion 24 on the driven element and the large pinions 23 will, because of their greater peripheries, rotate the pinion 25 with its associated pinion 31 and drum 27 in a reverse direction.

As long as this reverse or retrograde movement of the drum 27 is permitted, there will of course be no transmission of power between the prime mover and the driven element, but if the drum 27 is now held against such retrograde movement, there will be a transmission of power at a reduction. As soon as such a transmission of power occurs, through operation of the device 30, the driven element commences to rotate at its reduced speed, and, when the speed of the driven element is sufficient, the weight members 28 carried thereby will frictionally engage with the stationary drum 27 and will, provided that the load resistance is not too great, gradually bring the speed of rotation of the same up to that of the driven element, whereupon the now unnecessary multiplication of torque gradually disappears and a direct one to one drive through the transmission is obtained.

If the load resistance is now increased from any cause to an amount greater than the motor is designed to pull in a direct one to one drive, the flexible coupling means embodied in the weight members 28 and the drum 27 will automatically be caused to release, thereby effecting, by the slowing up or stopping of the drum, a multiplication of torque which approaches, in the stationary position of the drum, approximately a five to one reduction between the prime mover and the driven element.

In order to obtain a reverse rotation of the driven element, it is only necessary to shift the pinion 46 rearwardly; whereupon the forward rotation of the shaft 17 of the driven element is converted into a reduced reverse rotation of the shaft 18 of the driven element.

It will be understood from the foregoing explanation that the transmission is capable of a gradual speed ratio variation from zero to maximum under a multiplication of torque which is variable and is determined by the load resistance, and that the only manipulation necessary to render the transmission operative or inoperative is the closing or opening, respectively, of the valve 37 in the device 30.

The lever 38, which operates the valve 37, is linked to a foot pedal 50. A ratchet arrangement 51 of any suitable type carried by a second foot pedal 52 serves to catch and retain pedal 50 in its forward depressed position, which is its position when the valve 37 is closed; and this ratchet arrangement releases the pedal 50 when the pedal 52 is forwardly depressed. The pedals 50 and 52 may advantageously be employed to operate the emergency and foot brakes, respectively, of the vehicle with which the transmission is associated.

Owing to the mass and balance presented by the weight members 14, the ordinarily massive fly wheel of a vehicle motor may be dispensed with, in the manner shown, in favor of a light skeleton fly wheel into a central recessed portion of which the weight members and a major portion of the coacting drum are housed, thereby lightening and condensing the aggregate weight and size of the coupled motor and transmission.

The embodiment of the invention illustrated in Figs. 4, 5, and 6 will now receive consideration. This embodiment may possibly appear upon casual inspection to be quite dissimilar to the first embodiment, but such is not the case. The general principles underlying both forms of the invention are the same, and the second embodiment can therefore probably best be described by reference to the outstanding constructional differences found therein. The portions thereof common to both embodiments have accordingly been referenced with corresponding numerals.

In this embodiment the prime mover is shown as a shaft 53 which is clutched at will to the motor by means of an ordinary friction clutch (not shown) operated by the usual yoke lever 54, and the flexible coupling means embodied in the weight members 14 and drum 16 of the first embodiment is dispensed with, the stub axles 20 instead being carried in a bracket 55 which is rigidly secured to the shaft 53. The gear train, which includes the pinions 22, 23, 24 and 25, is associated with the prime mover, the driven element and the drum 27 in the same way as in the first embodiment; and the only difference in the flexible coupling means is the journalling of the spider 29 on the driven shaft 17 and the introduction of a clutch 56 for securing the spider to the shaft whereby the spider and its associated weight members 28 may be released at will by a fork control 57 from a rigid connection with the driven element, resulting in a fixed reduction which corresponds generally with the low or first reduction of ordinary transmissions.

The device 30 for preventing retrograde movement of the drum 27 is of a different type from that disclosed in the first embodiment. The device is a positive mechanical one, and is not, in the form shown, capable of being rendered inoperative; wherefore, in order to have the driven element at rest when the motor is running, it is necessary to unclutch the shaft 53 from the motor.

The device 30, as shown in Fig. 5, includes a pinion 58 which is meshed with the pinion 31 and is rigidly mounted on a countershaft 59 in the casing 10, a worm 60 which is also rigidly mounted on the countershaft 59 at a point spaced from the pinion 58, a worm gear 61 which is meshed with the worm 60 and is journalled for both rotation and axial movement on a countershaft 62 positioned at right angles to the countershaft 59, and a ratchet clutch 63 having a stationary portion carried by the casing and a movable portion carried by one face of the worm gear.

It will be understood, from the construction and arrangement of this gear train and ratchet clutch, that the pinion 31 can rotate in a clockwise direction, as viewed in Fig. 5, without interference by the device 30, since the beveled teeth of the ratchet clutch will shift the worm gear 61 axially out of its clutched position, but, if the pinion 31 tries to rotate in the other direction, the worm gear 61 will be shifted axially into its clutched position by the engagement of its angular teeth with the threads of the worm 60.

It will of course be understood that, in both embodiments of the invention, all moving parts of the transmission are intended to operate in oil, which oil is adapted to partially fill the casing 10; the oil serving to lubricate the friction surfaces between the weights and drums, to supply the fluid essential to the operation of the device 30 in the first embodiment, and to lubricate the teeth and journals of the various pinions.

The weight members 14 and 28, as shown in Fig. 6, may most advantageously be positioned relative to their spiders by means of transverse keys 64 which are adapted to be received in opposed recesses 65 and 66 formed respectively in the members and spiders. The fabric friction coverings 15 for the members may advantageously be removably secured to the outer arcuate peripheries of the members by being riveted to flat clips 67 which slide transversely onto the members in positioning end grooves 68 and are locked in position by overlapping screw-retained disks 69.

The scope of the invention obviously extends to various other power transmission structures in which the underlying principles of the invention may be embodied, and is to be understood as limited only by the language of certain of the broader appended claims.

The reduction in the transmission of power between the prime mover and the driven element when the drum is held against retrograde movement may be varied to operate at any desired ratio by merely varying the relative sizes of the pinions in the gear train. The reduction will obviously increase as the size of the pinion 22 approaches that of the pinion 23.

I claim:

1. In a flexible power transmission, a rotary prime mover, a rotary driven element, friction members mounted for synchronous rotation with the driven element and shiftable away from the axis thereof under centrifugal force, a drum adapted to be engaged by the friction members and brought by the same gradually from a stationary position to the speed of the driven element when the latter is rotated at sufficient speed, a gear train operatively associated with the prime mover, the driven element and the drum and adapted to effect a reduced driving connection between the prime mover and the driven element when the drum is held against retrograde movement, and a one-way clutch for holding the drum against retrograde movement without interfering with forward movement of the same.

2. In a flexible power transmission, a rotary prime mover, a rotary driven element, friction members mounted for synchronous rotation with the driven element and shiftable away from the axis thereof under centrifugal force, a drum adapted to be engaged by the friction members and brought by the same gradually from a stationary position to the speed of the driven element when the latter is rotated at sufficient speed, a gear train operatively associated with the prime mover, the driven element and the drum and adapted to effect a reduced driving connection between the prime mover and the driven element when the drum is held against retrograde movement, and means operable at will to hold the drum against retrograde movement only.

3. In a flexible power transmission, a rotary prime mover, a rotary driven element, a set of weights mounted for rotation with the driven element and shiftable away from the axis thereof under centrifugal force, a drum adapted to be engaged frictionally by the weights and brought by the same gradually from a stationary position to the speed of the driven element when the latter is rotated at or above a certain speed, counter-shafts revolvable with the driving element, small and large pinions on the counter-shafts rotatable with each other, a pinion connected with the driven element and meshing with said small pinion, another pinion connected with the drum and meshing with said large pinion, and a one-way clutch for holding the drum against reverse rotation.

4. In a flexible power transmission, a rotary driving element, a rotary driven element, two sets of weights mounted for rotation respectively with the driving and driven elements, two drums adapted to be engaged frictionally by the two sets of weights, and planetary gearing having a back-stop for one element thereof connected with both of the drums and the driven element in such a way that the drum which is adapted to be engaged by the weights rotating with the driving element will when so engaged drive the driven element through the gearing at a reduction and the drum which is adapted to be engaged by the other weights will when so engaged rotate in unison with the driven element and lock the gearing to effect a direct drive through the transmission.

In testimony whereof I have hereunto set my hand.

WILLIAM E. JOHNSON.